United States Patent [19]

Okayama et al.

[11] Patent Number: 4,846,542
[45] Date of Patent: Jul. 11, 1989

[54] OPTICAL SWITCH MATRIX

[75] Inventors: Hideaki Okayama; Akio Matoba; Nobuo Kobayashi; Issei Asabayashi; Kiyoshi Nagai; Ryoko Shibuya, all of Tokyo, Japan

[73] Assignee: Oki Electric Industry Co., Ltd., Tokyo, Japan

[21] Appl. No.: 254,690

[22] Filed: Oct. 7, 1988

[30] Foreign Application Priority Data

Oct. 9, 1987 [JP] Japan ................... 62-255260
Oct. 9, 1987 [JP] Japan ................... 62-255261

[51] Int. Cl.$^4$ .............................. G12B 6/26
[52] U.S. Cl. ..................... 350/96.15; 350/96.12
[58] Field of Search ............ 350/96.11, 96.12, 96.13, 350/96.14, 96.15, 96.16

[56] References Cited

U.S. PATENT DOCUMENTS 4,630,883 12/1986 Taylor et al. ............... 350/96.15
4,674,823 6/1987 Takahashi et al. ........... 350/96.13
4,787,692 11/1988 Spanke ....................... 350/96.16

FOREIGN PATENT DOCUMENTS 53-144353 12/1978 Japan ..................... 350/96.13
56-92524 7/1981 Japan ..................... 350/96.13
60-76722 5/1985 Japan ..................... 350/96.14

OTHER PUBLICATIONS

Monolithically Integrated Optical Gate 2×2 Matrix Switch Using GaAs/AlGaAs Multiple Quantum Well Structure, by: M. Tamburrini, L. Goldberg, J. F. Weller, 8/20/87.
Strictly Nonblocking 8×8 Integrated Optical Switch Matrix, by: P. Grandestrand, B. Stoltz, L. Thylen, K. Bergvall, 4/3/86.

Primary Examiner—Frank Gonzalez
Attorney, Agent, or Firm—Wenderoth, Lind & Ponack

[57] ABSTRACT

An optical switch matrix for selecting an optical propagation route between input ports and output ports by electric control. A first directional coupler is disposed on the input port side of a crosspoint of the matrix. A second directional coupler is disposed on the output port side of the crosspoint. A corner reflector is formed at a joint of the first and second directional coupler.

4 Claims, 4 Drawing Sheets

OPTICAL SWITCH MATRIX

BACKGROUND OF THE INVENTION

1. Field of the Invention

This invention relates to an optical switch matrix which selects propagation route between I/O parts by electric control.

2. Description of the Prior Art

The optical switch matrix has switch elements at each crosspoint of the matrix, which change direction of an optical signal.

In order to propagate optical signals efficiently, it is important that propagation loss in passing switch elements is reduced.

A switch element employed for a conventional optical switch matrix is illustrated in FIG. 1.

In FIG. 1, a switch element is composed of directional coupler 60 and waveguide 63a, 63b, 64a, 64b. The directional coupler 60 has two parallel waveguides 61 and 62. Electrodes 65 and 66 are formed respectively on the parallel waveguie 61 and 62. The parallel waveguide 65 is jointed between waveguide 63b and 64a. The parallel waveguide 66 is jointed between waveguide 63a and 64b. Corner reflectors 67–70 are formed at their joint corners.

For example, in FIG. 1, an optical signal imputed into waveguide 63a reflects on the corner reflector 69, and propagates in parallel waveguide 62. As a result of interaction between parallel waveguide 61 and 62, the optical signal is transfered to the parallel waveguide 61. Then, the optical signal reflects on the corner reflector 68, and propagates in the waveguide 63b.

On the other hand, by controling voltage applied to the electrodes 65 and 66, the optical signal is not transfered from the parllel waveguide 62 to the parallel waveguide 61. In this case, the optical signal reflects on the corner reflector 70, and then propagates in the waveguide 64b.

However, in passing each switch element, the optical signal reflects on the corner reflectors two times necessarily. As to m X n matrix for example, the optical signal may reflect on corner reflectors maximum (m+n−1)×2 times propagation paths. Propagation loss occurs every time the optical signal reflects.

SUMMARY OF THE INVENTION

It is an object of the present invention to provide an optical switch matrix where propagation loss is reduced.

Another object of the invention is to provide an optical switch matrix which can be miniaturized and manufactured with a low cost.

A further object of the invention is to provide an optical switch matrix which has a improved cross talk characteristic.

The above and other objects, features and advantages of the present invention will become more apparent from the following descreption when taken in conjunction with the accompanying drawings in which a preferred embodiment of the present invention is shown by way of illustrated example.

BRIEF DESCRIPTION OF THE DRAWIGNS

DESCRIPTION OF THE PREFERRED EMBODIMENT

Figure 1:
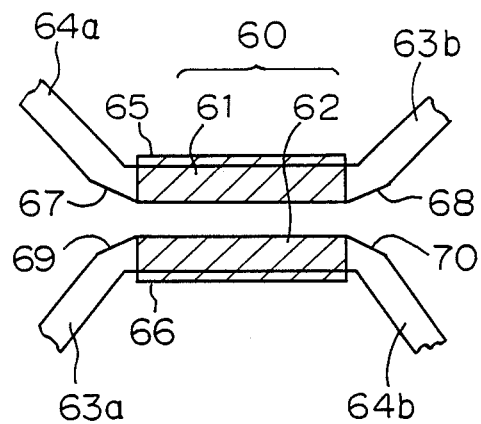
FIG. 1 is a schematic plan view of a switch element employed for a conventional optical switch matrix.
Figure 2:
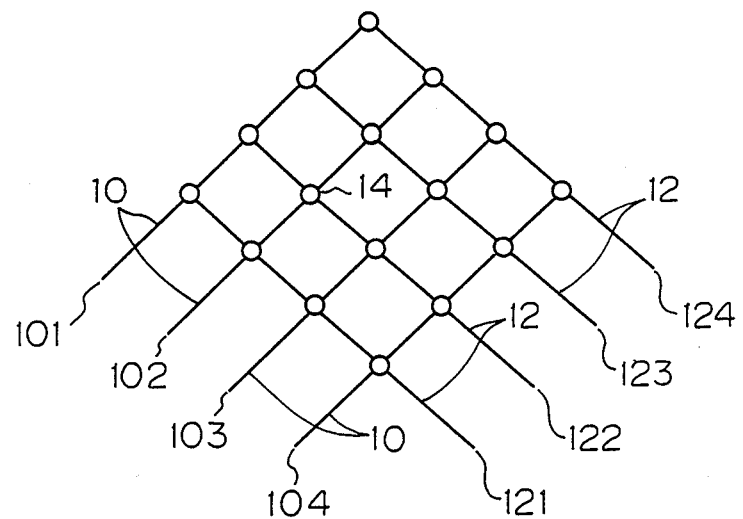
FIG. 2 is a schematic plan view of an optical switch matrix according to the present invention.
Figure 3:
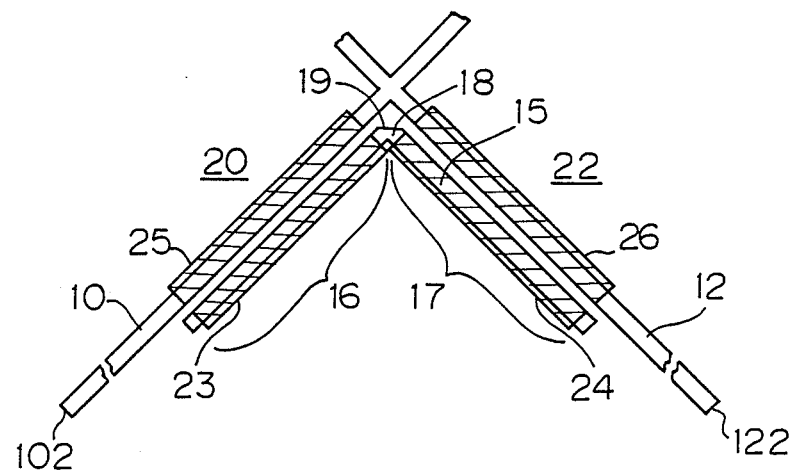
FIG. 3 is a schematic plan view of a first embodiment of a switch element according to the invention.

A first embodiment according to the present invention is illustrated in FIGS. 2 and 3.

In FIG. 2, 4×4 matrix for example, is formed with four input waveguides 10 and four output waveguides 12 crossing mutually. The matrix has four input ports 101–104 and four output ports 121–124. Switch elements 14 are disposed at each crosspoint of the matrix. In order to fabricate such optical switch matrix, GaAs substrate, for example, is employed.

With reference to FIG. 3, a structure of the switch element 14 is described. The switch element 14 is composed of an input waveguide 10, an output waveguide 12 and a transfer waveguide 15. The transfer waveguide 15 has a first waveguide 16 being parallel to the input waveguide 10 and a second waveguide 17 being parallel to the output waveguide 12. A corner reflector 19 is formed at a joint corner 18 of the first and second waveguide 16 and 17.

The first waveguide 16 and the input waveguide 10 compose a first directional coupler 20. The second waveguide 17 and the output waveguide 12 compose a second directional coupler 22. Control electrodes 23 and 24 are formed on the first and second waveguide 16 and 17. Ground electrodes 25 and 26 are formed on the input and output waveguide 10 and 12.

For example, in FIG. 3, an optical signal is propagated from the input port 102 to the input waveguide 10. As a result of interaction between parallel waveguides, the optical signal is transfered to the first waveguide 16. Then, the optical signal reflects on the corner reflector 19, and propagates in the second waveguide 17.

As a result of interaction between parallel waveguides again, the optical signal is transfered to the second waveguide 12, and then goes toward the output port 122.

On the other hand, by applying prescribed voltage to the control electrode 23, the optical signal is not transfered from the input waveguide 10 to the first waveguide 16.

Further for example, by applicating prescribed voltage to the control electrode 24, the optical signal propagated to the output waveguide 12 is not transfered to the second waveguide 17. Then, the optical signal goes toward output port 122.

According to the first embodiment, as discribed above, whatever propagation route is selected, the optical signal reflects on the corner reflector only once irrespective of a matrix scale. Therefore, propagation loss is reduced.

Figure 4:
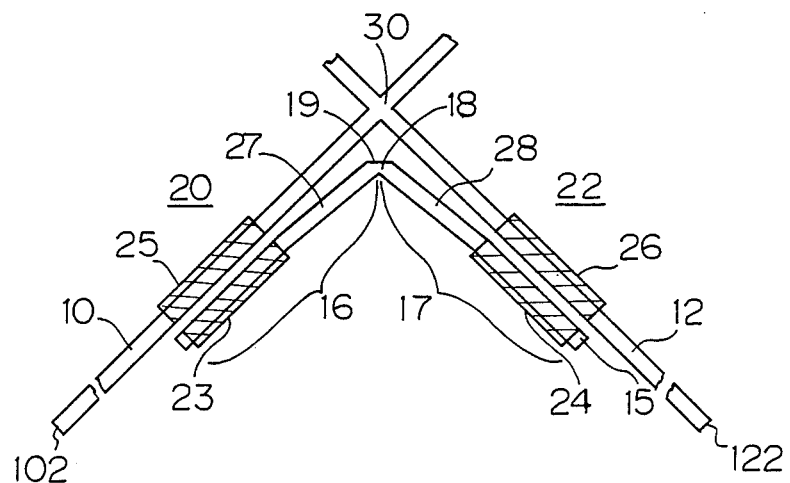
FIG. 4 is a schematic plan view of a second embodiment of a switch element according to the invention.

A second embodiment of the present invention is illustrated in FIG. 4. The same reference number is adapted to the same portion shown in FIG. 3.

In FIG. 3, the first(second) waveguide 16(17) includes, from it's middle point to the joint corner 18, a non-parallel waveguide 27(28) which is not parallel to the input(output) waveguide 10(12). The non-parallel waveguides 27 and 28 are disposed so that the joint corner 18 draws back from the crosspoint of the input and output waveguide 10 and 12. The nonparallel waveguides 27 and 28 may be straight or bent.

According to the second embodiment, the corner reflector 19 draws back from the crosspoint relatively. Therefore, in passing the crosspoint, scatter of the optical signal by the corner reflector 19 is reduced.

Figure 5:
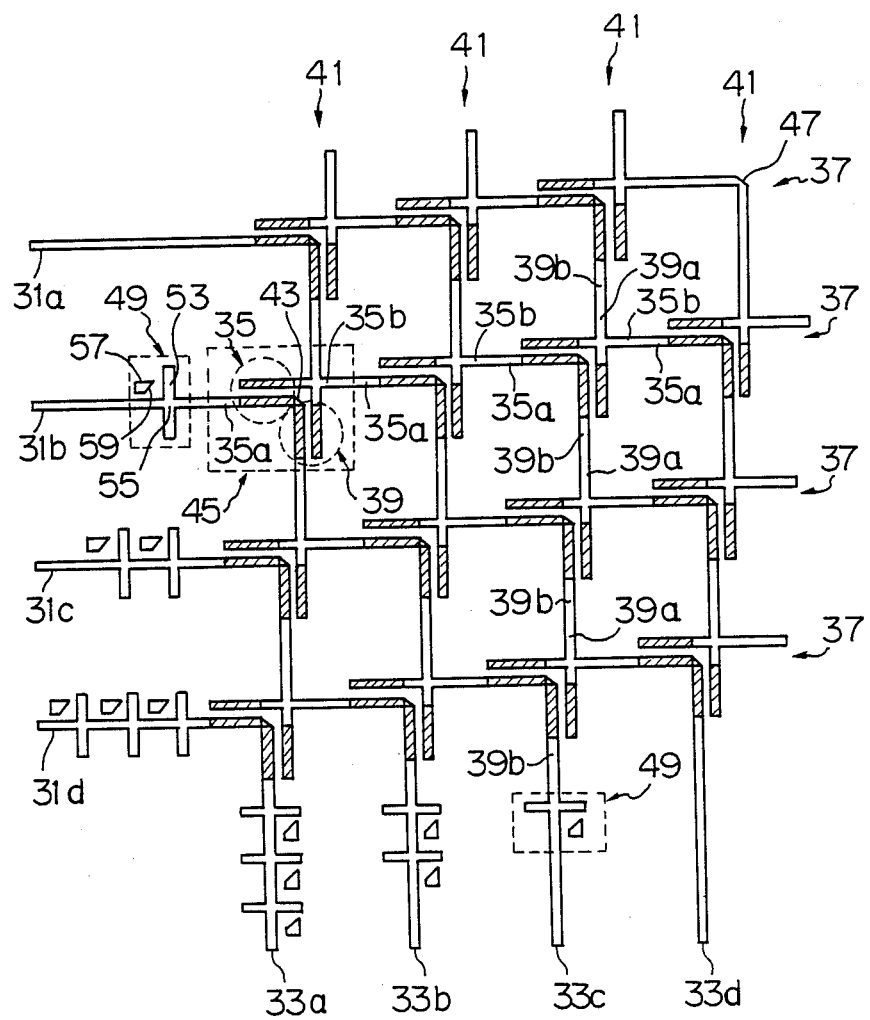
FIG. 5 is a schematic plan view of a third embodiment of an optical switch matrix according to the invention.

A third embodiment of the present invention is illustrated in FIG. 5.

In FIG. 5, 4×4 matrix, for example, is formed with four input waveguides 37 and four output waveguides 41 crossing mutually.

The input waveguide 37 consists of four stages. In each stage, a first directional coupler 35 has a first waveguide 35a which extends to an input port 31b and a second waveguide 35b which extends in the opposite direction.

The first and second waveguide 35a and 35b overlap mutually so that cross-state can occur. The second waveguide 35b is coupled to the first waveguide 35a of the next stage.

The output waveguide 41 consist of four stage. In each stage, a second directional coupler 39 has a fourth waveguide 39b which extends to an output port 33a and a third waveguide 39a which extends in the opposite direction.

The third and fourth waveguide 39a and 39b overlap mutually so that the cross-state can occur. The fourth waveguide 39b is coupled to the third waveguide 39a of the next stage.

The first and fourth waveguide 35a and 39b are jointed. A corner reflector 43 is formed at the joint corner. The second and third waveguide 35b and 39a cross at a portion which does not participate in the cross-state.

The first and second directional couplers 35 and 39 compose a switch element 45.

At a crosspoint of the input waveguide 37 which is connected to a input port 31a and the output waveguide 41 which is connected to an output port 33a, a corner reflector 47 is formed. the first and second directional coupler 35 and 39 may be formed at this crosspoint.

Figure 6:
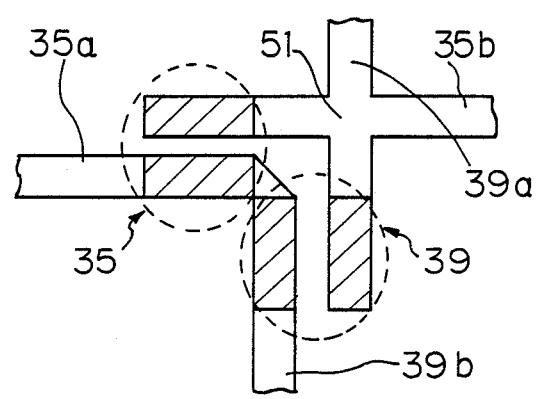
FIG. 6 is a schematic plan veiw of a switch element of the third embodiment.

With reference to FIG. 6, an operation of the switch element 45 is described. The same reference number is adapted to the same portion shown in FIG. 5.

For example, in FIG. 6, an optical signal is propagated from the input port 31b to the first waveguide 35a. As a result of interaction between parallel waveguides, the optical signal is transfered to the second waveguide 35b, and then goes straight.

On the other hand, by controlling voltage applicated to electrodes (hatching portions) of the first directional coupler 35, the optical signal is not transfered from the first waveguide 35a to the second waveguide 35b. Then, the optical signal reflects on the corner reflector 43, and propagates in the fourth waveguide 39b. Subsequently, by controlling voltage applied to electrodes of the second directional coupler 39, the optical signal goes toward the output port 33b.

Further for example, an optical signal which is propagated to the third waveguide 39a, is transfered to the fourth waveguide 39b as a result of interaction between parallel waveguides. Then, the optical signal goes toward output port 33b.

According to the third embodiment, as described above, whatever propagation route is selected, the optical signal reflects on the corner reflector only once irrespective of a matrix scale. Therefore, propagation loss is reduced.

In FIG. 5, in order to equalize strength of the optical signals at the output ports, the third embodiment has dummy elements 49.

The dummy element 49 is disposed between the input port 31a and the nearest switch element 45 to it. The dummy element 45 has a first and second dummy waveguides 53 and 57. The first dummy waveguide 53 crosses the input waveguide 37 to make a crosspoint 55. The second dummy waveguide 57 disposed adjacent to the crosspoint 55. At one end of the second dummy waveguide 57, a corner reflector 59 is formed to face toward the crosspoint 55.

In passing the dummy element 49, since the optical signal is scattered by the corner reflector 59, propagation loss occurs. The loss occurs equally when the optical signal passes the crosspoint of the second and third waveguide 35b and 39a.

In FIG. 5, one dummy element 49 is disposed between the input port 31b(output port 33c) and the nearest switch element 45 to it. Two dummy elements 49 are disposed between the input port 31c(output port 33b) and the nearest switch element 45 to it. Three dummy elements 49 are disposed between the input port 31d(output port 33a) and the nearest switch element 45 to it.

Since the dummy elements 49 are disposed as described above, whatever propagation route is selected, the optical signal is scattered six times equally by the corner reflectors 43 and 59. Therefore, the optical signal has same strength at any output port.

Such dummy elements may be adapted to the first and second embodiments of the present invention.

What is claimed is:

1. An optical matrix switch for selecting an optical propagation route between input ports and output ports with electric control, comprising;

plural input waveguides each connected to said input ports;

plural output waveguides each connected to said output ports and crossing said input waveguides to form crosspoints;

a first directional coupler disposed on said input port side of said crosspoint, and composed of a portion of said input waveguide and a first waveguide which is parallel to said input waveguide;

a second directional coupler disposed on said output port side of said crosspoint, and composed of a portion of said output waveguide and a second waveguide which is parallel to said output waveguide, said first and second waveguides jointed to form a joint corner adjacent to said crosspoint; and a corner reflector formed at said joint corner, which reflects an optical signal.

2. An optical matrix switch according to claim 1, further comprising;

a dummy element disposed adjacent to said input port, and having a first dummy waveguide which crosses said input waveguide to form another crosspoint and a second dummy waveguide which is disposed adjacent to said another crosspoint, said second dummy waveguide having a corner reflector on said another crosspoint side.

3. An optical matrix switch for selecting an optical propagation route between input ports and output ports with electric control, comprising;

plural input waveguides respectively connected to said input ports, and composed of four stages, each of said stage having a first waveguide which extends to said input ports and a second waveguide which extends in an opposite direction, said first and second waveguide overlapping mutually to form a first directional coupler, said second waveguide connected to a first waveguide of a next stage;

plural output waveguides respectively connected to said output ports, and composed of four stages, each of said stages having a fourth waveguide which extends to said output ports and a third waveguide which extends in an opposite direction, said third and fourth waveguides overlapping mutually to form a second directional coupler, said fourth waveguide connected to a third waveguide of a next stage;

said second and third waveguides crossing at a portion which does not porticipate in a cross-stage, said first and fourth waveguides jointed to form a joint corner; and a corner reflector formed at said joint corner, which reflects an optical signal.

4. An optical matrix switch according to claim 3, further comprising;

a dummy element disposed adjacent to said input port, and having a first dummy waveguide which crosses said input waveguide to form a crosspoint and a second dummy waveguide which is disposed adjacent to said crosspint, said second dummy waveguide having a corner reflector on said crosspoint side.

* * * * *